US009645855B2

United States Patent
Seo et al.

(10) Patent No.: US 9,645,855 B2
(45) Date of Patent: May 9, 2017

(54) JOB SCHEDULING OPTIMIZATION BASED ON RATIO OF STALL TO ACTIVE CYCLES

(71) Applicants: Samsung Electronics Co., Ltd., Suwon-si (KR); Korea Advanced Institute of Science and Technology, Daejeon-si (KR)

(72) Inventors: Woong Seo, Hwaseong-si (KR); Yeon-Gon Cho, Hwaseong-si (KR); Soo-Jung Ryu, Hwaseong-si (KR); Seok-Woo Song, Daejeon-si (KR); John Dongjun Kim, Daejeon-si (KR); Min-Seok Lee, Daejeon-si (KR)

(73) Assignees: SAMSUNG ELECTRONICS CO., LTD., Suwon-si, Gyeonggi-Do (KR); KOREA ADVANCED INSTITUTE OF SCIENCE AND TECHNOLOGY, Daejeon-si (KR)

( * ) Notice: Subject to any disclaimer, the term of this patent is extended or adjusted under 35 U.S.C. 154(b) by 242 days.

(21) Appl. No.: 14/276,522

(22) Filed: May 13, 2014

(65) Prior Publication Data

US 2014/0337849 A1 Nov. 13, 2014

(30) Foreign Application Priority Data

May 13, 2013 (KR) ........................ 10-2013-0054031

(51) Int. Cl.
*G06F 9/50* (2006.01)
*G06F 9/46* (2006.01)
*G06F 9/48* (2006.01)

(52) U.S. Cl.
CPC ................ *G06F 9/505* (2013.01); *G06F 9/46* (2013.01); *G06F 9/4881* (2013.01); *G06F 2209/5022* (2013.01)

(58) Field of Classification Search
CPC .... G06F 9/505; G06F 9/46; G06F 2209/5022; G06F 9/4881
See application file for complete search history.

(56) References Cited

U.S. PATENT DOCUMENTS

| 5,821,769 A | * | 10/1998 | Douseki | ............. | H01L 27/0218 |
| | | | | | 326/121 |
| 6,549,930 B1 | * | 4/2003 | Chrysos | ................ | G06F 9/4881 |
| | | | | | 718/104 |

(Continued)

FOREIGN PATENT DOCUMENTS

| JP | 08-153023 A | 6/1996 |
| KR | 10-2010-0016347 A | 2/2010 |
| KR | 10-2012-0083000 | 1/2011 |

OTHER PUBLICATIONS

Narasiman, Veynu, et al. "Improving GPU Performance via Large Warps and Two-Level Warp Scheduling." *Proceedings of the 44th Annual IEEE/ACM International Symposium on Microarchitecture.* ACM, Dec. 2011.

(Continued)

*Primary Examiner* — Benjamin Wu

(57) ABSTRACT

An apparatus and a job scheduling method are provided. For example, the apparatus is a multi-core processing apparatus. The apparatus and method minimize performance degradation of a core caused by sharing resources by dynamically managing a maximum number of jobs assigned to each core of the apparatus. The apparatus includes at least one core including an active cycle counting unit configured to store a number of active cycles and a stall cycle counting unit configured to store a number of stall cycles and a job scheduler configured to assign at least one job to each of the at least one core, based on the number of active cycles and the number of stall cycles. When the ratio of the number of stall cycles to a number of active cycles for a core is too (Continued)

great, the job scheduler assigns fewer jobs to that core to improve performance.

17 Claims, 6 Drawing Sheets

(56) References Cited

U.S. PATENT DOCUMENTS

| | | | | |
|---|---|---|---|---|
| 7,386,739 | B2* | 6/2008 | Ghiasi | G06F 1/3203 |
| | | | | 713/300 |
| 8,069,444 | B2* | 11/2011 | Fedorova | G06F 9/4881 |
| | | | | 711/130 |
| 8,245,232 | B2* | 8/2012 | Mutlu | G06F 13/1663 |
| | | | | 712/214 |
| 8,365,181 | B2* | 1/2013 | Flower | G06F 9/5033 |
| | | | | 709/201 |
| 9,176,759 | B1* | 11/2015 | Sahasranaman | G06F 9/45504 |
| 9,268,611 | B2* | 2/2016 | Iyer | G06F 9/5027 |
| 9,405,349 | B2* | 8/2016 | Seo | G06F 1/3234 |
| 2002/0078124 | A1 | 6/2002 | Baylor et al. | |
| 2006/0156306 | A1 | 7/2006 | Di Gregorio et al. | |
| 2006/0168571 | A1* | 7/2006 | Ghiasi | G06F 9/505 |
| | | | | 717/127 |
| 2008/0282251 | A1 | 11/2008 | Bruce et al. | |
| 2008/0307419 | A1 | 12/2008 | Klein et al. | |
| 2009/0138683 | A1* | 5/2009 | Capps, Jr. | G06F 9/30101 |
| | | | | 712/220 |
| 2011/0246995 | A1* | 10/2011 | Fedorova | G06F 9/5033 |
| | | | | 718/103 |
| 2012/0079235 | A1 | 3/2012 | Iyer et al. | |
| 2012/0079503 | A1 | 3/2012 | Dally et al. | |
| 2016/0132354 | A1* | 5/2016 | Iyer | G06F 9/5027 |
| | | | | 718/108 |

OTHER PUBLICATIONS

Rogers, Timothy G., Mike O'Connon, and Tor M. Aamodt. "Cache-Concious Wavefront Scheduling." *Proceedings of the 2012 45th Annual IEEE/ACM International Symposium on Microarchitecture.* IEEE Computer Society, Dec. 2012.

Korean Office Action issued on Feb. 25, 2015 in counterpart Korean Application No. 10-2013-0054031 (7 pages, with English translation).

* cited by examiner

JOB SCHEDULING OPTIMIZATION BASED ON RATIO OF STALL TO ACTIVE CYCLES

CROSS-REFERENCE TO RELATED APPLICATIONS

This application claims from the benefit under 35 U.S.C. §119(a) of Korean Patent Application No. 10-2013-0054031 filed on May 13, 2013, in the Korean Intellectual Property Office, the entire disclosure of which is incorporated herein by reference for all purposes.

BACKGROUND

1. Field

The following description relates to an apparatus and a job scheduling method thereof. More specifically, the following description relates to a multi-core processing apparatus and a job scheduling method thereof that dynamically manage a maximum number of jobs assigned to each core of the multi-core processing apparatus.

2. Description of Related Art

An application executed by a multi-core system, particularly a general-purpose application being executed by graphics processing units (GPUs), enables easy parallelization of a large amount of data to be processed, since there is no dependency between the data to be processed.

Furthermore, it is established that a maximum use of available computing resources has the effect of increasing the enhanced performance provided by parallelization. For example, in a scenario, an application may mainly use independent resources, such as a register file, a scratchpad memory, a computing unit, and so on, in a core for each core. In this scenario, as the number of jobs increases, the effects of memory access latency or pipeline latency is decreased because of the independence of the resources. Because latency is reduced, it improves overall performance.

However, in a scenario in which an application mainly or entirely uses a memory shared by all cores, for example, there may be a case where overall performance is not improved by the parallel use of multiple cores due to maximum bandwidth limitations of a network and/or a memory, even though the number of simultaneously executing jobs is increased. Further, due to network congestion caused by excessive traffic, and depletion of L2 cache capacity, there may also be a case where performance is actually degraded when the number of jobs is increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus includes a core, including an active cycle counting unit configured to store a number of active cycles and a stall cycle counting unit configured to store a number of stall cycles, and a job scheduler configured to assign one or more jobs to the core, wherein the number of jobs to be assigned to the core is based on the number of active cycles and the number of stall cycles.

The apparatus may further include a memory configured to store input and output data used by the core and the job scheduler, and a network configured to connect the job scheduler, the memory, and the core.

The core may further include a front end unit and an execution unit, and in response to instructions being transmitted to the execution unit, the front end unit stores the number of active cycles and the number of stall cycles in the active cycle counting unit and the stall cycle counting unit, respectively.

The job scheduler may determine the number of jobs to be assigned to the core based on a ratio of the number of stall cycles to the number of active cycles.

The apparatus may provide that in response to the ratio of a number of stall cycles to a number of active cycles of the core exceeding a threshold, the job scheduler reduces the number of jobs to be assigned to the core.

The core may further include an L1 cache, and the job scheduler may be further configured to adjust the number of jobs to be assigned to the core in consideration of a consecutive input data size of jobs and a line size of the L1 cache.

In another general aspect, a job scheduling method of an apparatus performed by a job scheduler includes calculating a ratio of a number of stall cycles to a number of active cycles based on the number of active cycles and the number of stall cycles received from a core, and reducing a number of jobs to be assigned to a the core in response to the ratio of the number of stall cycles to the number of active cycles exceeding a threshold, and maintaining a number of jobs to be assigned to the specific core in response to the ratio of the number of stall cycles to the number of active cycles not exceeding the threshold.

The job scheduling method may further include, in response to a number of jobs assigned to the core being less than an optimal number of jobs of the core, increasing the optimal number of jobs of the core, and assigning new jobs to the core.

The job scheduling method may further include, in response to a number of jobs assigned to the core being greater than or equal to an optimal number of jobs of the core, omitting assigning new jobs to the core.

The job scheduling method may further include adjusting a number of jobs simultaneously assigned to the core in consideration of a consecutive input data size of jobs and a line size of an L1 cache included in the core.

In another general aspect, a non-transitory computer-readable storage medium storing a program for job scheduling, the program comprising instructions for causing a computer to carry out the method presented above.

In another general aspect, a multi-core processing apparatus includes a plurality of cores, each comprising an active cycle counting unit configured to store a number of active cycles and a stall cycle counting unit configured to store a number of stall cycles, a job scheduler configured to assign jobs to the cores, wherein the number of jobs assigned to each core is chosen to maximize normalized instructions per cycle (IPC) for each core.

The apparatus may further provide each core further includes a front end unit and an execution unit, and in response to instructions being transmitted to the execution unit, the front end unit stores the number of active cycles and the number of stall cycles in the active cycle counting unit and the stall cycle counting unit, respectively.

The apparatus may further include a memory configured to store input and output data used by the cores and the job scheduler, and a network configured to connect the job scheduler, the memory, and the cores.

The maximizing normalized instructions per cycle (IPC) for each core may consider bandwidth for at least one of the memory and the network.

The cores may share the memory and each core may include an L1 cache that is not shared by the other cores.

The maximizing normalized instructions per cycle (IPC) for each core may consider consecutive input data size of jobs and a line size of the L1 cache included in the core.

The maximizing normalized instructions per cycle (IPC) for each core may consider dependency information for the instructions.

The maximizing normalized instructions per cycle (IPC) for each core may consider processing requirements for a particular job.

The maximizing normalized instructions per cycle (IPC) for each core may consider availability of system resources.

Other features and aspects will be apparent from the following detailed description, the drawings, and the claims.

Figure 1:
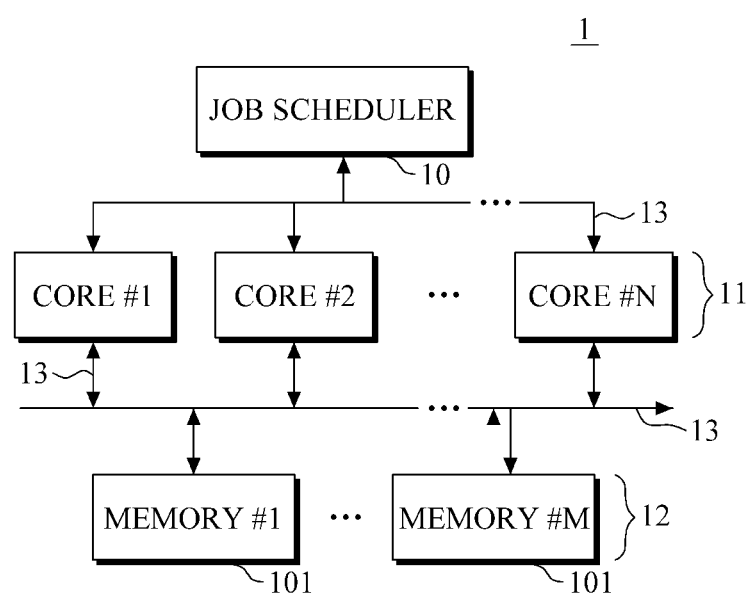
FIG. 1 is a block diagram illustrating an example of a configuration of a general multi-core system, according to an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, examples of a multi-core system and a job scheduling method thereof will be described in detail with reference to the accompanying drawings.

Embodiments provide a technology for scheduling to assign jobs to each core in a multi-core system by setting bounds on the number of jobs to avoid degrading performance.

FIG. 1 is a block diagram illustrating an example of a configuration of a general multi-core system, according to an embodiment.

As illustrated in FIG. 1, an example multi-core system 1 is configured to include a job scheduler 10, a plurality of cores 11, a plurality of memories 12, and a network 13 that connects the job scheduler 10, the plurality of cores 11 and the plurality of memories 12. The network 13 may include wired connections, wireless connections, or a combination of wired and wireless connections.

The job scheduler 10 distributes jobs to each core included in a multi-core system according to a state of resources of each core included in the multi-core system. For example, a job refers to a bundle, including a plurality of data, which are batch-processed by the core.

The core 11 processes one or more assigned jobs. In this scenario, the core 11 has a register file and a small-sized cache (private cache) and/or a memory (scratchpad memory). These resources allow jobs to be managed by being divided into units for independent execution, which enables the jobs to be processed at the same time in one cycle.

The memory 12 stores input and output data, and is shared by all cores 11. Because the memory 12 is shared, access to the memory 12 by the cores 11 is managed so as to ensure that access to the memory 12 by the cores 11 does not invalidate the contents of the memory 12.

The network 13 connects the job scheduler 10, the plurality of cores 11 and the plurality of memories 12. The network 13 is a transmission path of data and control signals. That is, the network allows the constituent parts of the multi-core system to share information with one another, where the information may be information that is processed or information about how to process other information.

The job scheduler 10 assigns a maximum number of jobs to be processed by each core 11. The maximum number of jobs is based on the state of resources available at the core 11. For example, the state of resources is derived from a state of a register file, a state of a shared memory, or another state indicative of the ability of the core 11 to process jobs.

However, in the case of an application mainly using a memory shared by all cores, for example, the memory 12 shown in FIG. 1, there is potentially a scenario where performance is not improved due to a maximum bandwidth limit of the network 13 and the memory 12, even though the number of simultaneous jobs is increased. In this situation, even though more jobs are being executed at the same time, some jobs are forced to wait due to maximum bandwidth limits of the network 13 and the memory 12. Further, due to network congestion caused by excessive traffic, and depletion of L2 cache capacity, there may also be a situation where performance is even degraded when the number of jobs is increased. In this situation, the overhead necessary to manage multiple jobs cause delays that would not be necessary if fewer jobs were being executed.

Figure 2:
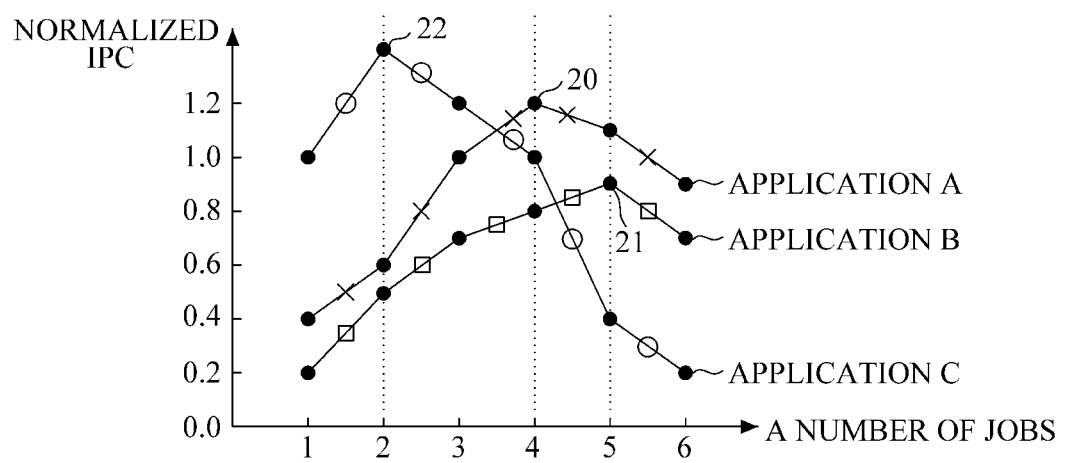
FIG. 2 is a graph illustrating an example of a change of instructions per cycle (IPC) according to a number of jobs of each application, according to an embodiment.

FIG. 2 is a graph illustrating an example of a change of instructions per cycle (IPC) according to the number of jobs for each application, according to an embodiment.

Instructions per cycle (IPC) is a metric for how effective parallelism is. The higher the value of IPC, the more processing is accomplished by a core for each clock cycle. Hence, since a processor generally has a fixed clock rate, if the IPC value is greater it is possible for the processor to accomplish more because more processing is completed by the cores.

As illustrated in FIG. 2, in the case of application A, performance (normalized IPC) is improved to a point 20 where the number of jobs is four. In this case, increasing the number of jobs to four increases performance, because application A includes jobs that are sufficiently independent to accomplish more up to this point. However, when the number of jobs exceeds four, performance is rather degraded. As discussed above, such performance degradation potentially occurs because jobs must share resources such as network and memory resources, and if there are too many jobs, it will create bottlenecks caused by sharing these resources.

Similarly, in the case of application B, performance (normalized IPC) is improved to a point 21 where the number of jobs is five, whereas when the number of jobs exceeds five, performance is degraded. In the case of application C, performance (normalized IPC) is improved to a point 22 where the number of jobs is two, whereas when the number of jobs exceeds two, performance is degraded. For applications B and C, the issues are similar to the issues involved when the considering the performance of application A, but applications B and C happen to have different optimal numbers of jobs.

Therefore, it is helpful for scheduling to assign jobs to each core within the bounds of the number of jobs that would not degrade performance. Such scheduling incorporates information about the particular application and the resources at each core, so as to help determine how to allocate jobs to cores so that jobs are allocated to cores until a point is reached whether allocating additional jobs impairs performance.

Figure 3:
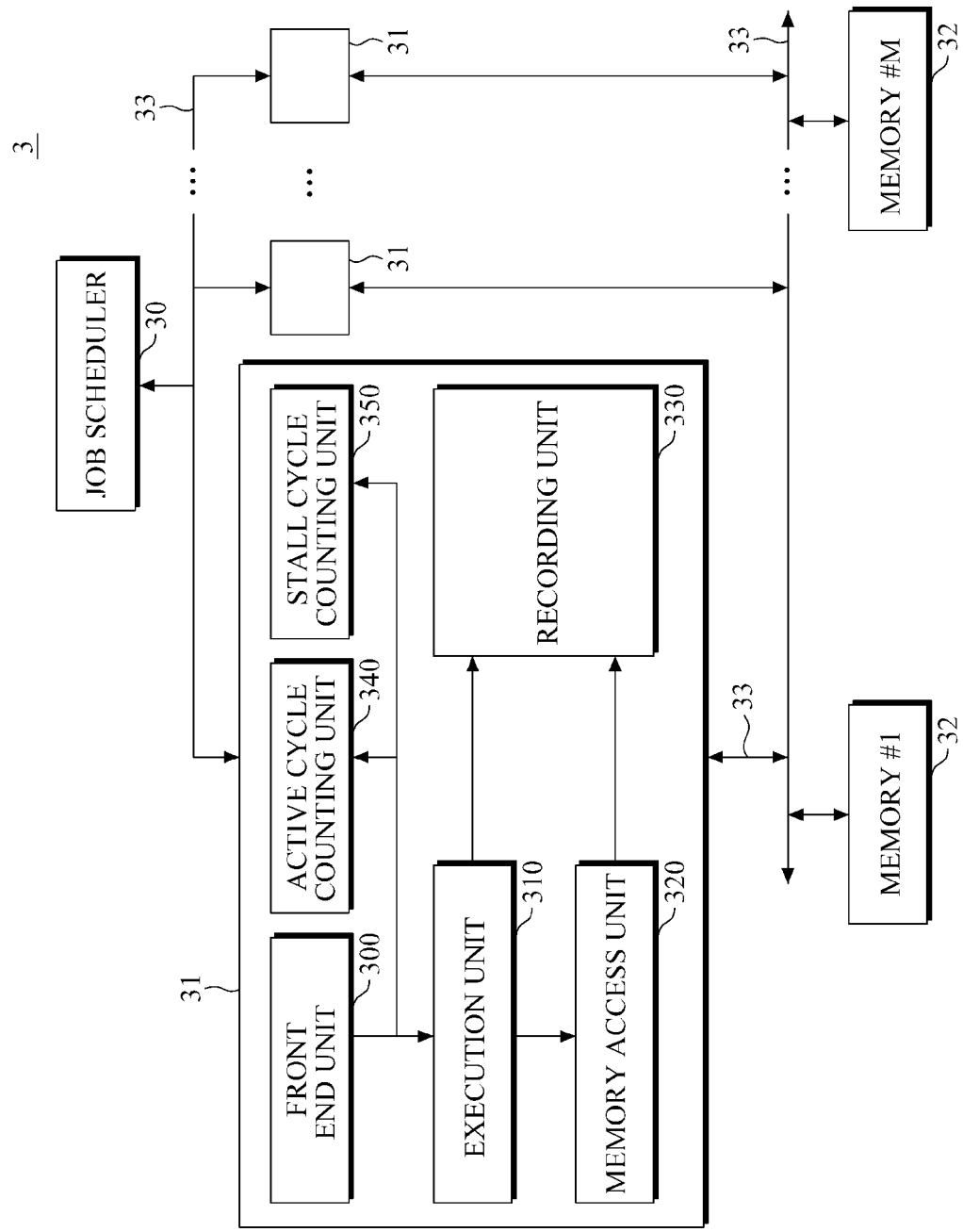
FIG. 3 is a block diagram illustrating an example of a multi-core system according to an aspect of an exemplary embodiment, according to an embodiment.

FIG. 3 is a block diagram illustrating an example of a multi-core system according to an aspect of an embodiment.

As illustrated in FIG. 3, an example multi-core system 3 is configured to include a job scheduler 30, a plurality of cores 31, a plurality of memories 32, and a network 33 that connects the job scheduler 30, the plurality of cores 31 and the plurality of memories 32.

The job scheduler 30 distributes and assigns jobs to each core according to a state of resources of each of the plurality of cores 31, which together constitute the cores of a multi-core system 3.

The core 31 processes one or a plurality of jobs assigned to it, such as by the job scheduler 30. In FIG. 3, one core 31 is illustrated in an expanded manner to illustrate its constituent elements, and the other cores 31 are illustrated as other cores included in the plurality of cores 31. When performing processing tasks assigned to it, the core 31 includes resources such as one or more of a register file, a small-sized cache (private cache), and a scratchpad memory. These resources provide working memory for the core, so that jobs are managed by being divided into independent units, which enables the jobs to be processed at the same time in one cycle.

The memory 32 stores input and output data, and is shared by all cores 31. As discussed further, because the memory 32 is shared by all cores 31, managing memory access is a part of successful parallelism.

The network 33 connects the job scheduler 30, a plurality of cores 31, and a plurality of memories 32, and is a transmission path of data and control signals between these functional elements of the multi-core system 3.

Meanwhile, each core 31, in the example of FIG. 3, further includes a front end unit 300, an execution unit 310, a memory access unit 320, a recording unit 330, an active cycle counting unit 340, and a stall cycle counting unit 350. The relationship and connectivity between these elements of each core is illustrated in the left-most core presented in FIG. 3. Additionally, these functional elements of each core 31 are examples, and in other embodiments other elements are included in one or more of the cores 31, in lieu of or in addition to the units illustrated in FIG. 3

The front end unit 300 reads instructions of assigned jobs from the memory 32 or a cache (not shown), and transmits the instructions to the execution unit 310. Thus, the role of the front end unit 300 is to provide intake for instructions for a core from an appropriate source of instructions.

Furthermore, the front end unit 300 checks for dependencies between instructions, and postpones transmission of instructions in a cycle when dependency is not resolved in that cycle. While postponing transmission of instructions when dependency is not resolved in a given cycle slows down the processing, it is performed because if interdependent instructions are processed before the dependency is resolved, incorrect results potentially occur.

Transmission of instructions is also potentially held off if available system resources are insufficient. In such a situation, the front end unit 300 delays transmission of instructions so as to wait for more system resources to become available. A stall condition is a condition, such as a dependency issue or a lack of system resources, in which valid instructions are not transmitted from the front end unit 300 to the execution unit 310. When a stall condition occurs, a cycle passes without instructions being transmitted for execution and hence performance suffers. Herein, a cycle in which the stall condition occurs is referred to as a stall cycle.

Further, an active condition is a condition in which the front end unit 300 transmits valid instructions to the execution unit 310 for execution. A cycle in which the active condition occurs is referred to as an active cycle.

The execution unit 310 processes data input from the front end unit 300 according to a type of instructions that specifies how the data input is to be processed.

The memory access unit 320 reads data from the memory 32 and/or records data in the memory 32.

The recording unit 330 records, in a register file (not shown) of the core 31, data that is processed in the execution unit 310, or data that is read from the memory 32 by the memory access unit 320.

The active cycle counting unit 340 records a number of active cycles in which instructions are transmitted from the front end unit 300 to the execution unit 310. The stall cycle counting unit 350 records a number of stall cycles when instructions are transmitted from the front end unit 300 to the execution unit 310. Thus, given that each cycle is an active cycle or a stall cycle, the active cycle counting unit 340 and the stall cycle counting unit 350 provide counts of the active cycles and the stall cycles, in which the total number of the active cycles and the stall cycles add up to the total number of cycles.

A cycle ratio between the number of stall cycles and the number of active cycles may be defined as in Equation 1. The greater the cycle ratio, the less efficient the processing is, because the cycle ratio is greater when there are more stall cycles or fewer active cycles, both of which occur when the processing is less efficient.

$$\text{(Cycle ratio)} = \text{(the number of stall cycles)}/\text{(the number of active cycles)} \quad \text{Equation 1}$$

As mentioned above, depending on an application, in response to the number of jobs exceeding a threshold, performance is rather degraded. As discussed above, the threshold number of jobs varies from application to application. Once the number of jobs exceeds such a threshold, the number of stall cycles increases. As a result, performance is degraded. However, until the number of jobs reaches the threshold, performance improves. Hence, to optimize performance, it is appropriate to increase the number of jobs so that they reach but do not exceed the threshold.

Therefore, an increased cycle ratio leads to degradation of processing performance of a core, and minimizing the cycle ratio is desirable because it indicates better processing performance for a core.

In a multi-core system 3 as shown in FIG. 3, in response to a cycle ratio of a specific core among a plurality of cores 31 exceeding a certain value, the job scheduler 30 performs job scheduling by reducing a maximum number of jobs of the core. In an example, the certain value is "1," which is a value that, if exceeded, indicates that there are more stall cycles than active cycles. However, other values are be used for the certain value in other embodiments. When the job scheduler reduces the maximum number of jobs of the core, it improves the cycle ratio because if there are fewer jobs, it causes less need for stall cycles due to dependencies and resource overload, thereby reducing the number of stall cycles and improving the cycle ratio.

To this end, the job scheduler 30 receives a number of active cycles and a number of stall cycles of a core from the active cycle counting unit 340 and the stall cycle counting unit 350 of each of the plurality of cores 31. Based on these received numbers, the job scheduler 30 then calculates a cycle ratio to perform job scheduling for each core. As discussed above, in an example the job scheduler 30 operates such that if the cycle ratio exceeds the certain value for a core, the job scheduler 30 schedules fewer jobs for that core to improve its performance.

Alternatively, the front end unit 300 of each of the plurality of cores 31 calculates a cycle ratio based on a number of active cycles and a number of stall cycles of the core stored in the active cycle counting unit 340 and the stall cycle counting unit 350 of the core 31. In this case, the job scheduler 30 performs job scheduling by receiving a cycle ratio of a core 31 from the front end unit 300 of each core 31, and adjusting a maximum number of jobs of each core 31.

Figure 4:
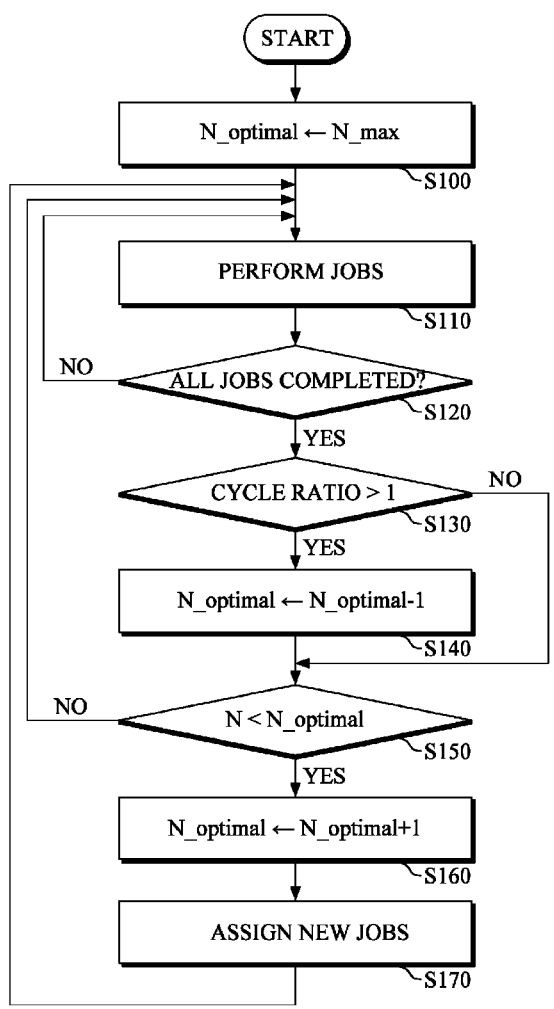
FIG. 4 is a flowchart illustrating an example method of dynamic scheduling of a multi-core system, according to an embodiment.

FIG. 4 is a flowchart illustrating an example method of dynamic scheduling of a multi-core system.

FIG. 4 illustrates an example of job scheduling of a job scheduler performed for one core among a multi core of the multi-core system in FIG. 3, according to an embodiment.

In S100, the method sets a maximum number of assigned jobs (N_max) for the core as an optimal number of assigned jobs (N_optimal) for the core, and assigns as many jobs as the maximum number of assigned jobs. For example, the job scheduler sets a maximum number of assigned jobs (N_max) for the core as an optimal number of assigned jobs (N_optimal) for the core, and assigns as many jobs as the maximum number of assigned jobs.

In S110 the method performs the jobs. For example, the core performs jobs that the job scheduler assigns. In S120 the method determines if all jobs are completed. For example, if all jobs are not completed, the job scheduler continues to perform jobs until all the jobs are completed.

When all the jobs are completed in the core, the core informs the job scheduler of completion of jobs through the network. In addition, the core also informs the job scheduler of a number of active cycles and a number of stall cycles that occurred when performing the jobs. In S130, the method calculates a cycle ratio, and compares it to a certain value. For example, based on the number of active cycles and the number of stall cycles transmitted from the core, the job scheduler calculates a cycle ratio as defined in Table 1. In the example of FIG. 4, the certain value is 1, but other values of the certain value are used in other examples.

In S140, if the cycle ratio exceeds the certain value, the method decreases N_optimal for the core. For example, if a cycle ratio of a core exceeds 1, or another certain value, it means the stall cycles are a high percentage cycles performed by the core, so the job scheduler reduces an optimal number of assigned jobs by 1. In alternative embodiments, it is possible to reduce the number of jobs by a different value. For example, in another embodiment, a heuristic is used to determine how many jobs the job schedule is to decrease N_optimal by. By contrast, if a cycle ratio of a core does not exceed 1, or another certain value, it means the stall cycle does not occupy a high percentage of the core, so the job scheduler does not change an optimal number of assigned jobs for the core.

In S150, the method assigns N new jobs to the core and compares N to N_optimal. For example, as all the jobs in the core are completed, the job scheduler assigns N new jobs, and the job scheduler ascertains if N<N_optimal. In S160, the method increases the optimal number of assigned jobs by 1. In alternative embodiments, it is possible to increase the number of jobs by a different value. For example, in another embodiment, a heuristic is used to determine how many jobs by which the job schedule is to increase N_optimal.

Thus, if the number of newly assigned jobs (N) is less than the optimal number of assigned jobs (N_optimal), the method increases the optimal number of jobs the job scheduler increases the optimal number of assigned jobs by 1 but, otherwise, does not change the optimal number of assigned jobs (N_optimal).

In S170, the job scheduler assigns new jobs to the cores. For example, thereafter, if the number of newly assigned jobs (N) is less than the optimal number of assigned jobs (N_optimal), the job scheduler assigns new jobs to the cores.

In an embodiment, S100 to S170 are performed independently for each core. Therefore, an optimal number of assigned jobs suited to the characteristics of each core is assigned to each core. Furthermore, as the optimal number of assigned jobs is dynamically increased or decreased by the job scheduler in consideration of a cycle ratio, the number of jobs assigned to the cores is changed in real time so as not to dynamically improve performance of the cores.

Meanwhile, in an embodiment the job scheduler monitors for a certain period of time (T_monitor) to obtain an optimal number of assigned jobs (N_optimal) when performing jobs initially assigned to cores. The certain period of time (T_monitor) may be, for example, a time based on the number of cycles taken to complete a first channel time allocation (CTA) in each core. The job scheduler obtains a cycle ratio (r) by constantly observing a number of active cycles and a number of stall cycles for a certain period of time (T_monitor), and then obtains an optimal number of assigned jobs (N_optimal) based on the cycle ratio (r).

Figure 5:
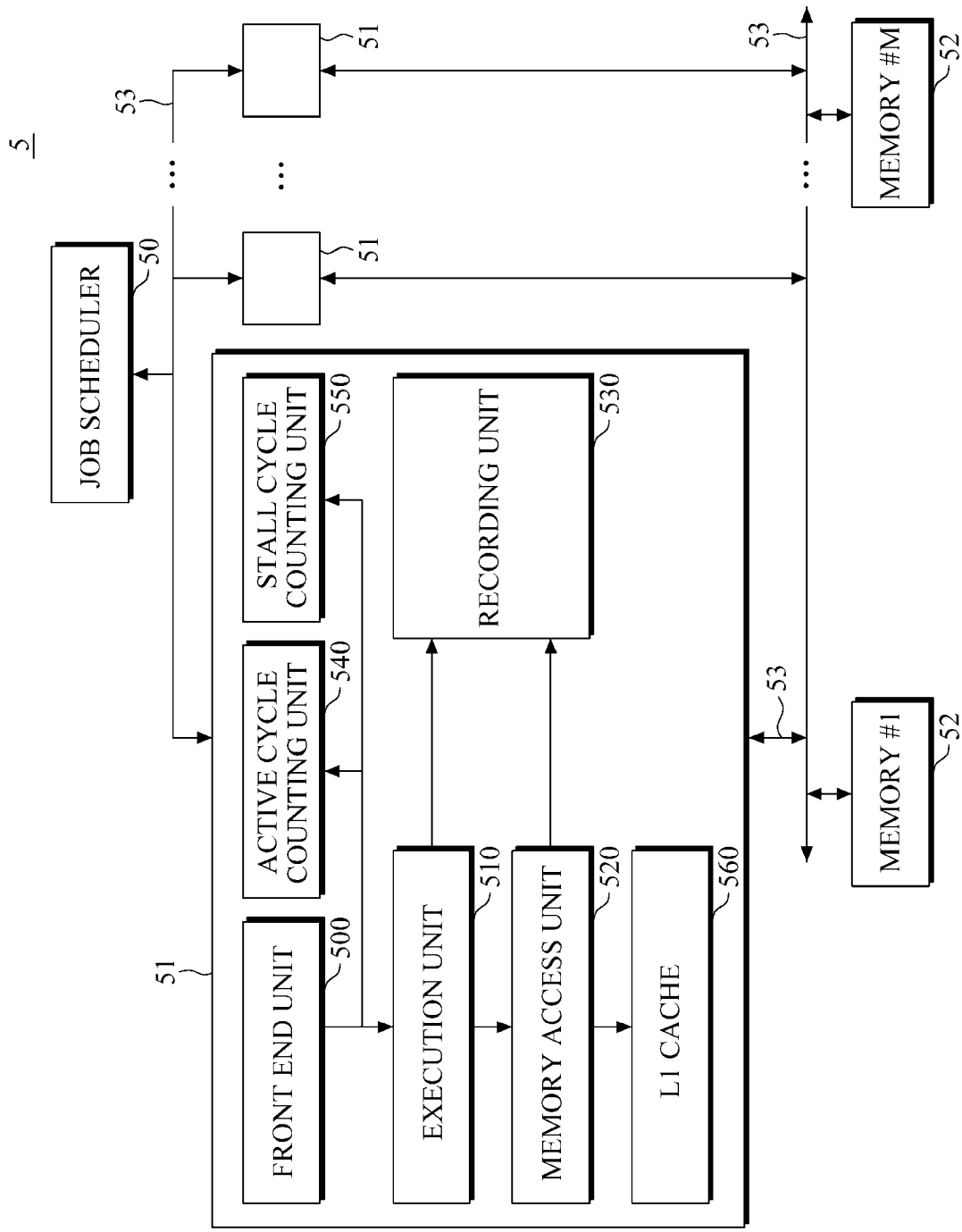
FIG. 5 is a block diagram illustrating an example of a multi-core system according to an aspect of another embodiment.

FIG. 5 is a block diagram illustrating an example of a multi-core system according to an aspect of another embodiment.

As illustrated in FIG. 5, the multi-core system 5 is configured to include a job scheduler 50, a plurality of cores 51, a plurality of memories 52, and a network 53 that connects the job scheduler 50, the plurality of cores 51 and the plurality of memories 52 to one another. Functions of each constituent element of the multi-core system 5 in FIG. 5 correspond to functions of each corresponding constituent element of the multi-core system 3 in FIG. 3.

Additionally, each core 51 further includes a front end unit 500, an execution unit 510, a memory access unit 520, a recording unit 530, an active cycle counting unit 540, a stall cycle counting unit 550 and an L1 cache 560.

The front end unit 500 reads instructions for assigned jobs from a memory 52 or the L1 cache 560, and transmits the instructions to the execution unit 510.

Additionally, the front end unit 500 checks dependencies between instructions, and postpones transmission of instructions in a cycle when a dependency is not resolved in that cycle. Transmission of instructions is also potentially postponed if system resources are insufficient. In the example of FIG. 5, a stall condition is a condition in which valid instructions are not transmitted from the front end unit 500 to the execution unit 510, and a cycle in which the stall condition occurs is a stall cycle.

Additionally, in this example, an active condition is a condition where the front end unit 500 transmits valid instructions to the execution unit 510, and a cycle in which the active condition occurs is an active cycle.

The execution unit 510 processes data input from the front end unit 500 according to a type of instructions. As discussed above, the instructions are received for assigned jobs from a memory 52 or the L1 cache 560.

The memory access unit 520 reads data from the memory 52 and/or records data in the memory 52.

The recording unit 530 records, in a register file (not shown) of the core 51, data that is processed in the execution unit 510, or data that is read from the memory 52 by the memory access unit 320.

The active cycle counting unit 540 records a number of active cycles that occur when instructions are transmitted from the front end unit 500 to the execution unit 510. The stall cycle counting unit 550 records a number of stall cycles that occur when instructions are transmitted from the front end unit 500 to the execution unit 510.

The L1 cache 560 temporarily stores jobs, instructions, data, and similar information, which are processed in the core 51. The L1 cache contributes to the improvement of system performance. The L1 cache not only has a fast access speed, because it takes less time to access than main memory, but the L1 cache is also processed independently for each core. However, conflicts between referenced data occur frequently. Cache memory is generally expensive, and hence only limited amounts are included in each core. Because limited amounts are available, only a portion of referenced data is accessible, which causes degradation in performance. Therefore, when the L1 cache 560 is used, data locality between jobs assigned to cores is a consideration.

Figure 6:
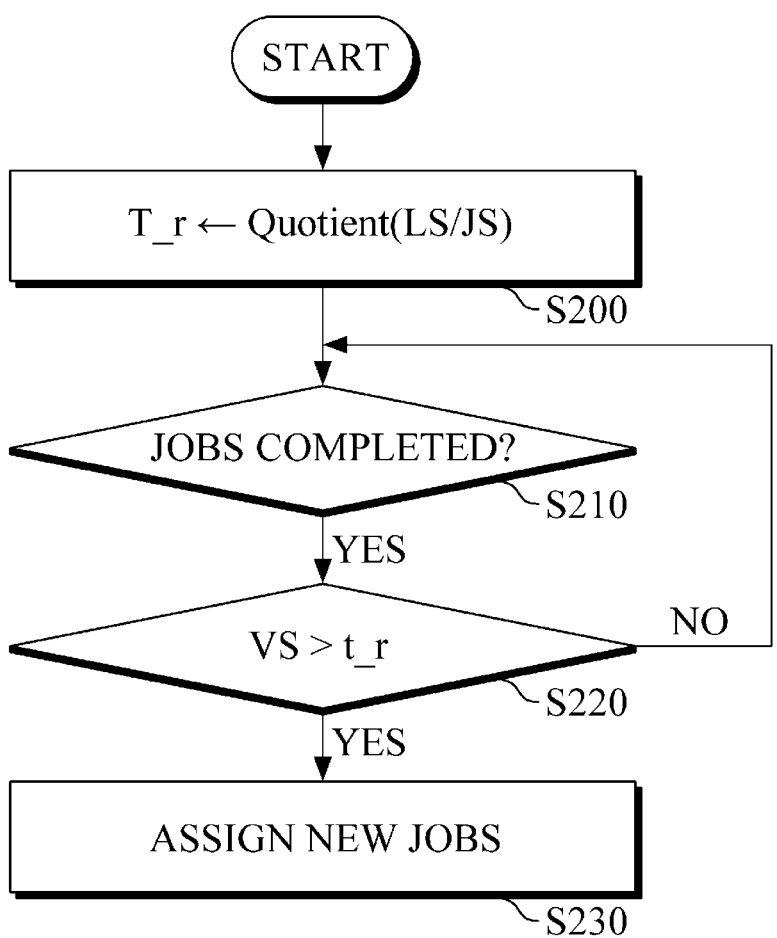
FIG. 6 is a flowchart illustrating an example method of job scheduling of a multi-core system including L1 cache, according to an embodiment.

FIG. 6 is a flowchart illustrating an example method of job scheduling of a multi-core system including L1 cache, according to an embodiment.

In S200, the method stores, as a value to be compared (t_2), a quotient obtained by dividing a line size by a job size. For example, as illustrated in FIG. 6, a quotient, which is obtained by dividing a line size (LS) of the L1 cache of a specific core by a consecutive input data size of a job (JS: job size), is set as a value to be compared (t_r).

In S210, the method determines if the jobs are complete. For example, if one job is performed in the core, the job scheduler compares the number of jobs to be assigned to the core with the value to be compared (t_r).

In S220, the method compares the number of jobs (vs) to be assigned to t_r. For example, if the number of jobs (vs) to be assigned to the core is not greater than the value to be compared (t_r), the core continues, and performs a next job, but when the number of jobs (vs) to be assigned to the core is greater than the value to be compared (t_r), in 230 the method assigns new jobs. For example, the job scheduler assigns new jobs to the core.

If the value to be compared (t_r), that is, a quotient obtained by dividing a line size (LS) of the L1 cache of a certain core by a consecutive input data size of a job (JS: job size), is the number of assigned jobs (N), then input data of consecutive or adjacent jobs are likely to be accessed by sharing one cache line. As a result, in a multi-core system including the L1 cache, the job scheduler does not assign new jobs every time each job is completed, but assigns new jobs after waiting until it is possible to assign a number N of jobs at the same time. Assigning N jobs at the same time as described improves utilization of a cache line and thus further improves performance The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such as parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), and any other device known to one of ordinary skill in the art to be included in a computing system or computer. The memory controller and the flash memory device may constitute a solid-state drive or disk (SSD) that uses a non-volatile memory to store data.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus, comprising:
    a core, comprising an active cycle counting unit configured to store a number of active cycles and a stall cycle counting unit configured to store a number of stall cycles; and
    a job scheduler configured to assign one or more jobs to the core, wherein the number of jobs to be assigned to the core is based on the number of active cycles and the number of stall cycles, wherein the job scheduler
    assigns an optimal number of assigned jobs to the core,
    calculates a ratio of the number of stall cycles to the number of active cycles,
    reduces the optimal number of assigned jobs in response to the ratio of the number of stall cycles to the number of active cycles exceeding a threshold, and maintains the optimal number of assigned jobs in response to the ratio of the number of stall cycles to the number of active cycles not exceeding the threshold,
    assigns a number of new jobs to the core, and
    in response to the number of new jobs assigned to the core being less than the optimal number of assigned jobs, increases the optimal number of assigned jobs, and assigns the new jobs to the core.

2. The apparatus of claim 1, further comprising:
    a memory configured to store input and output data used by the core and the job scheduler; and
    a network configured to connect the job scheduler, the memory, and the core.

3. The apparatus of claim 1, wherein the core further comprises a front end unit and an execution unit, and in response to instructions being transmitted to the execution unit, the front end unit stores the number of active cycles and the number of stall cycles in the active cycle counting unit and the stall cycle counting unit, respectively.

4. The apparatus of claim 1, wherein the core further comprises an L1 cache, and wherein the job scheduler is further configured to adjust the number of jobs to be assigned to the core in consideration of a consecutive input data size of jobs and a line size of the L1 cache.

5. A job scheduling method of an apparatus performed by a job scheduler, comprising:
    assigning an optimal number of assigned jobs to a core;
    calculating a ratio of a number of stall cycles to a number of active cycles based on the number of active cycles and the number of stall cycles received from the core;
    reducing the optimal number of assigned jobs in response to the ratio of the number of stall cycles to the number of active cycles exceeding a threshold, and maintaining the optimal number of assigned jobs in response to the ratio of the number of stall cycles to the number of active cycles not exceeding the threshold;
    assigning a number of new jobs to the core; and
    in response to the number of new jobs assigned to the core being less than the optimal number of assigned jobs, increasing the optimal number of assigned jobs, and assigning the new jobs to the core.

6. The job scheduling method of claim 5, further comprising:

in response to the number of new jobs assigned to the core being greater than or equal to the optimal number of assigned jobs, omitting assigning the new jobs to the core.

7. The job scheduling method of claim 5, further comprising:

adjusting a number of jobs simultaneously assigned to the core in consideration of a consecutive input data size of jobs and a line size of an L1 cache included in the core.

8. A non-transitory computer-readable storage medium storing instructions that, when executed by a processor, cause the processor to perform the method of claim 5.

9. A multi-core processing apparatus, comprising:

a plurality of cores, each comprising an active cycle counting unit configured to store a number of active cycles and a stall cycle counting unit configured to store a number of stall cycles;

a job scheduler configured to assign jobs to the cores, wherein the number of jobs assigned to each core is chosen to maximize normalized instructions per cycle (IPC) for each core, wherein the job scheduler assigns an optimal number of assigned jobs to each core, calculates a ratio of the number of stall cycles to the number of active cycles for each core, reduces the optimal number of assigned jobs for each core in response to the ratio of the number of stall cycles to the number of active cycles exceeding a threshold, and maintains the optimal number of assigned jobs for each core in response to the ratio of the number of stall cycles to the number of active cycles for the core not exceeding the threshold, assigns a number of new jobs to each core, and in response to the number of new jobs assigned to each core being less than the optimal number of assigned jobs for the core, increases the optimal number of assigned jobs for the core, and assigns the new jobs to the core.

10. The apparatus of claim 9, wherein each core further comprises a front end unit and an execution unit, and in response to instructions being transmitted to the execution unit, the front end unit stores the number of active cycles and the number of stall cycles in the active cycle counting unit and the stall cycle counting unit, respectively.

11. The apparatus of claim 9, further comprising:

a memory configured to store input and output data used by the cores and the job scheduler; and a network configured to connect the job scheduler, the memory, and the cores.

12. The apparatus of claim 11, wherein maximizing normalized instructions per cycle (IPC) for each core considers bandwidth for either one or both of the memory and the network.

13. The apparatus of claim 11, wherein the cores share the memory and wherein each core includes an L1 cache that is not shared by the other cores.

14. The apparatus of claim 13, wherein maximizing normalized instructions per cycle (IPC) for each core considers consecutive input data size of jobs and a line size of the L1 cache included in the core.

15. The apparatus of claim 9, wherein maximizing normalized instructions per cycle (IPC) for each core considers dependency information for the instructions.

16. The apparatus of claim 9, wherein maximizing normalized instructions per cycle (IPC) for each core considers processing requirements for a particular job.

17. The apparatus of claim 9, wherein maximizing normalized instructions per cycle (IPC) for each core considers availability of system resources.

* * * * *